(12) United States Patent
Takeuchi et al.

(10) Patent No.: US 9,513,767 B2
(45) Date of Patent: Dec. 6, 2016

(54) DISPLAYING POSTS IN REAL TIME ALONG AXES ON A COMPUTER SCREEN

(75) Inventors: Shigeki Takeuchi, Tokyo (JP); Yasuyuki Tominaga, Saitama (JP); Naomi Zenge, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1201 days.

(21) Appl. No.: 13/280,399

(22) Filed: Oct. 25, 2011

(65) Prior Publication Data

US 2012/0131512 A1 May 24, 2012

(30) Foreign Application Priority Data

Nov. 22, 2010 (JP) ................................. 2010-260426

(51) Int. Cl.
*G06F 3/0482* (2013.01)
*G06Q 50/00* (2012.01)

(52) U.S. Cl.
CPC ............. *G06F 3/0482* (2013.01); *G06Q 50/01* (2013.01)

(58) Field of Classification Search
CPC .............................. G06F 3/0482; G06Q 50/01
See application file for complete search history.

(56) References Cited

U.S. PATENT DOCUMENTS

| 7,107,532 B1 * | 9/2006 | Billmaier ............ G06F 3/0482 348/E5.103 |
| 8,473,868 B1 * | 6/2013 | Kauffman ............ G06F 3/0482 715/810 |
| 2006/0004914 A1 * | 1/2006 | Kelly .................... G06Q 30/00 709/219 |
| 2008/0092038 A1 * | 4/2008 | Audet ........................... 715/243 |
| 2009/0287693 A1 | 11/2009 | Audet |
| 2011/0021250 A1 * | 1/2011 | Ickman et al. ............... 455/566 |
| 2011/0173570 A1 * | 7/2011 | Moromisato et al. ........ 715/838 |
| 2012/0005224 A1 * | 1/2012 | Ahrens et al. ............... 707/769 |

(Continued)

FOREIGN PATENT DOCUMENTS

| JP | 11316766 A | 11/1999 |
| JP | 2002297661 A | 10/2002 |

(Continued)

OTHER PUBLICATIONS

Angela West, "The Ultimate Guide for Everything Twitter", Mar. 24, 2009, pp. 1-59.*

(Continued)

*Primary Examiner* — Ryan Pitaro
(74) *Attorney, Agent, or Firm* — Cantor Colburn LLP; Yeen Tham

(57) ABSTRACT

Sequentially displaying posts apart from each other on a computer screen, including prompting a user to input a dimension element including one or more of a character, graphic, or symbol on the computer screen; identifying posts containing one or more dimension elements; sequentially displaying the identified posts apart from each other along a first axis; displaying a moveable cursor along the first axis across one or more displayed posts and that indicates only one or more particular posts; moving the cursor according to the user's operation; identifying one or more posts at a position currently indicated by the cursor; identifying one or more additional posts containing one or more dimension elements related to the elements contained in the posts currently indicated by the cursor; and sequentially displaying posts of the one or more additionally identified posts along a second axis.

18 Claims, 9 Drawing Sheets

(56) References Cited

U.S. PATENT DOCUMENTS

| | | | | |
|---|---|---|---|---|
| 2012/0083260 A1* | 4/2012 | Arriola et al. | ................ | 455/418 |
| 2012/0183273 A1* | 7/2012 | Utsuki et al. | ................ | 386/230 |
| 2013/0073989 A1* | 3/2013 | Harris et al. | ................ | 715/758 |
| 2013/0298038 A1* | 11/2013 | Spivack et al. | ................ | 715/753 |
| 2014/0129942 A1* | 5/2014 | Rathod | ................ | 715/720 |
| 2014/0223347 A1* | 8/2014 | Seo et al. | ................ | 715/769 |

FOREIGN PATENT DOCUMENTS

| | | | |
|---|---|---|---|
| JP | 2003173356 A | 6/2003 |
| JP | 2003345888 A | 12/2003 |
| JP | 2004102996 A | 4/2004 |
| JP | 2004252797 A | 9/2004 |
| JP | 2004303213 A | 10/2004 |
| JP | 2004355286 A | 12/2004 |
| JP | 2006178599 A | 7/2006 |
| JP | 2007087110 A | 4/2007 |
| JP | 2007157023 A | 6/2007 |
| JP | 2008090365 A | 4/2008 |
| JP | 2009193133 A | 8/2009 |
| JP | 200446394 A | 12/2012 |

OTHER PUBLICATIONS

Kei Ogikubo, Twitter × Information Gathering, Enjoyable even without tweeting, Mac People vol. 16, No. 7, Japan, ASCII Media Works, May 29, 2010, vol. 16, pp. 137-147 (With English Translation).

Japanese Office Action for JP Application No. 2010-260426 Mailed Jul. 29, 2014; 3 pages.

Kei Ogikubo, Twitter × Information Gathering, Enjoyable even without tweeting, Mac People vol. 16, No. 7, Japan, ASCII Media Works, May 29, 2010, vol. 16, pp. 137-147.

\* cited by examiner

TRACKING OF RELATIONSHIP BETWEEN AXES WITH RESPECT TO
USER'S OPERATION OF MOVING CURSOR (MARKING)

DISPLAYING POSTS IN REAL TIME ALONG AXES ON A COMPUTER SCREEN

PRIORITY

This application claims priority to Japanese Patent Application No. 2010-260426, filed 22 Nov. 2010, and all the benefits accruing therefrom under 35 U.S.C. §119, the contents of which in its entirety are herein incorporated by reference.

BACKGROUND

The present invention relates to a user interface for effectively displaying posts on a computer screen. More specifically, the present invention relates to a mechanism with which posts continually transmitted from other computers are multilaterally displayed along axes on a computer screen according to a user's input or select operations, and the displayed posts are switched in real time.

Information transmission in the form of "murmurs" or "tweets" has been popular. This is done with a communication tool such that a loose connection is generated from each user posting a short phrase (e.g., text data within 140 characters) with monologic content, and such a communication tool has also become prevailing as corporation services. One such representative service is called "Twitter®" (Japan registration No. 5188811).

A unique uniform resource locator (URL) is assigned to each user's post. In each user's personal site or "home" (typically application software running on a computer operated by the user), the user's posts and posts of users previously "followed" by the user are displayed in a scrolling manner on a computer screen in a chronological sequence called a "timeline."

Compared to technologies such as blogging, this communication tool is characterized by a highly real-time nature and allows loose communications that may be triggered even by a post of casual asking, for example, "What's happening?"

However, in such cases as using this communication tool to participate in an open forum or an event, the more the user is following other users, the more posts are transmitted and displayed on the computer screen at a time. It is difficult to pick up the flow (situation or trend) of communications from the numerous posts.

This is even more difficult particularly when a number of topics or themes from a number of tweeters are mixed in posts that proceed in real time. This prevents effective feedback for establishing communications as timely "tweets."

In this respect, a tweeter, who is an information-transmitting user, may specify, for his "tweets" (posts), keywords predefined for topics. If such specification has been made, a user who is following the tweets of the tweeter may be able to take an approach of narrowing down the posts to only necessary posts according to the keywords. However, the narrowed-down result cannot be further narrowed down.

Also, "tweets" with no specified keyword cannot be narrowed down in the first place. As a real-time process, it is often the case in a daily conversation that a keyword forming a topic gradually shifts or suddenly changes. To establish natural and loose communications, such changes should be allowed, and the user is required to flexibly address such changes.

In the light of the above, there is a significant meaning in enabling a following user to multilaterally analyze posts in real time.

Japanese Patent Laid-Open No. 2004-46394 describes a system in which operation instructions written in a natural language are interpreted on a part-of-speech level to perform multidimensional analysis.

Japanese Patent Laid-Open No. 2009-193133 describes a system in which a user's single statement is analyzed to present information such as an advertisement related to the statement. However, the system does not perform analysis across several statements.

Japanese Patent Laid-Open No. 2004-252797 describes the following: information about an axis used for analysis by a first analyzer is stored along with a keyword, so that subsequent analyzers can enter the keyword to use the analysis axis information. However, the system is essentially effective only within the range of the analysis axis to be analyzed.

Japanese Patent Laid-Open No. 11-316766 describes readily constructing a multidimensional DB system by a user interactively selecting a format according to a sample structure (a scenario for analysis) provided in advance for each purpose of use. However, the system only sets the multidimensional DB analysis model based on an existing structure.

Japanese Patent Laid-Open No. 2004-303213 describes a system for automatically defining a dimension model based on an interrelationship of a relational schema. However, the system defines a dimension based on the interrelationship of the relational schema but does not define a dimension for analysis based on data stored in a single table.

SUMMARY

According to exemplary embodiments, a method, computer program product, and system for sequentially displaying posts apart from each other on a computer screen, each post representing a sentence visually recognizable by a user on the computer screen, includes prompting the user to input a dimension element including one or more of a character, graphic, or symbol on the computer screen; identifying posts that contain one or more dimension elements responsive to the user's input; sequentially displaying the identified posts apart from each other along a first axis on the computer screen; displaying a cursor that is movable by the user along the first axis across one or more posts displayed on the computer screen and that indicates only one or more particular posts among the displayed posts; moving the cursor on the computer screen according to the user's operation; identifying one or more posts at a position currently indicated by the cursor on the computer screen; identifying one or more additional posts containing one or more dimension elements related to one or more dimension elements contained in the one or more particular posts currently indicated by the cursor; and sequentially displaying posts of the one or more additionally identified posts apart from each other along a second axis different from the first axis and visually recognizable on the computer screen.

DETAILED DESCRIPTION

Figure 1:
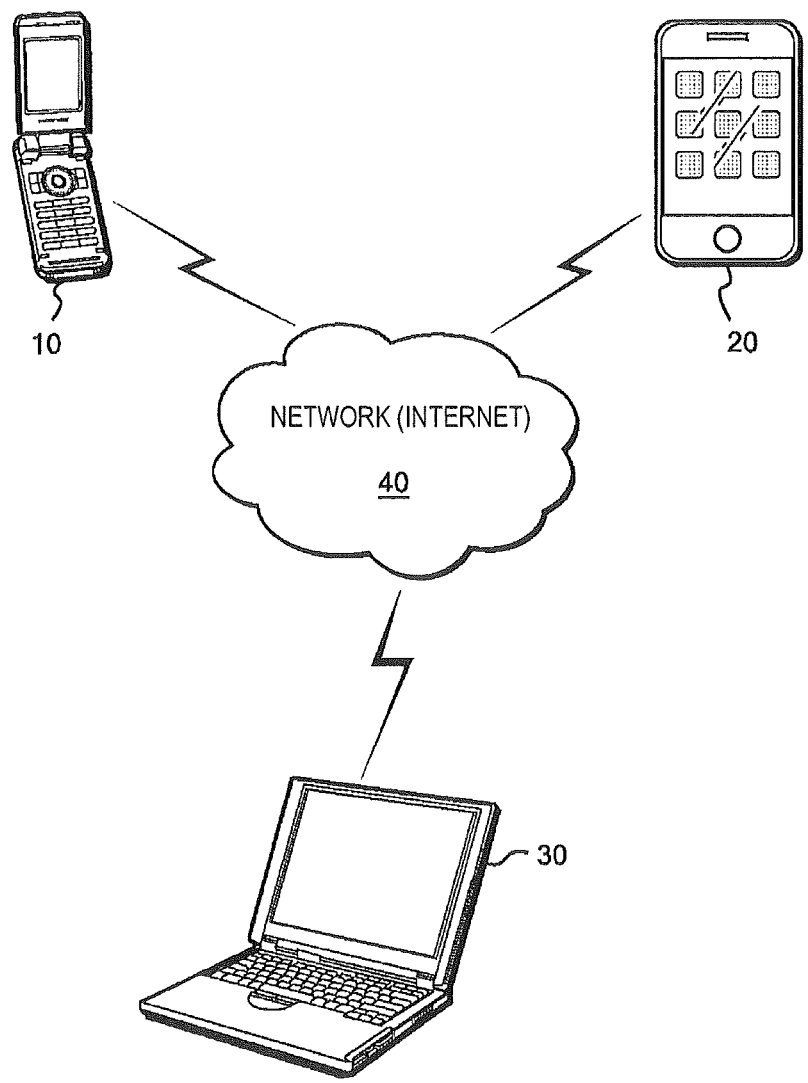
FIG. 1 is a diagram showing a connection relationship among computers serving as a background for implementing embodiments of the present invention.

FIG. 1 is a diagram showing a connection relationship among computers serving as a background for implementing embodiments of the present invention. A computer 10, a computer 20, and a computer 30 are each connected to a network 40 and communicate with each other. Users can loosely communicate with each other in real time by performing input operations or select operations while browsing posts displayed on a computer screen. The network 40 may typically be the Internet. It is widely known that mobile phones have been evolving and serving as computers usable in mobile environments, and the network 40 in such a circumstance may be a telephone network.

Figure 2:
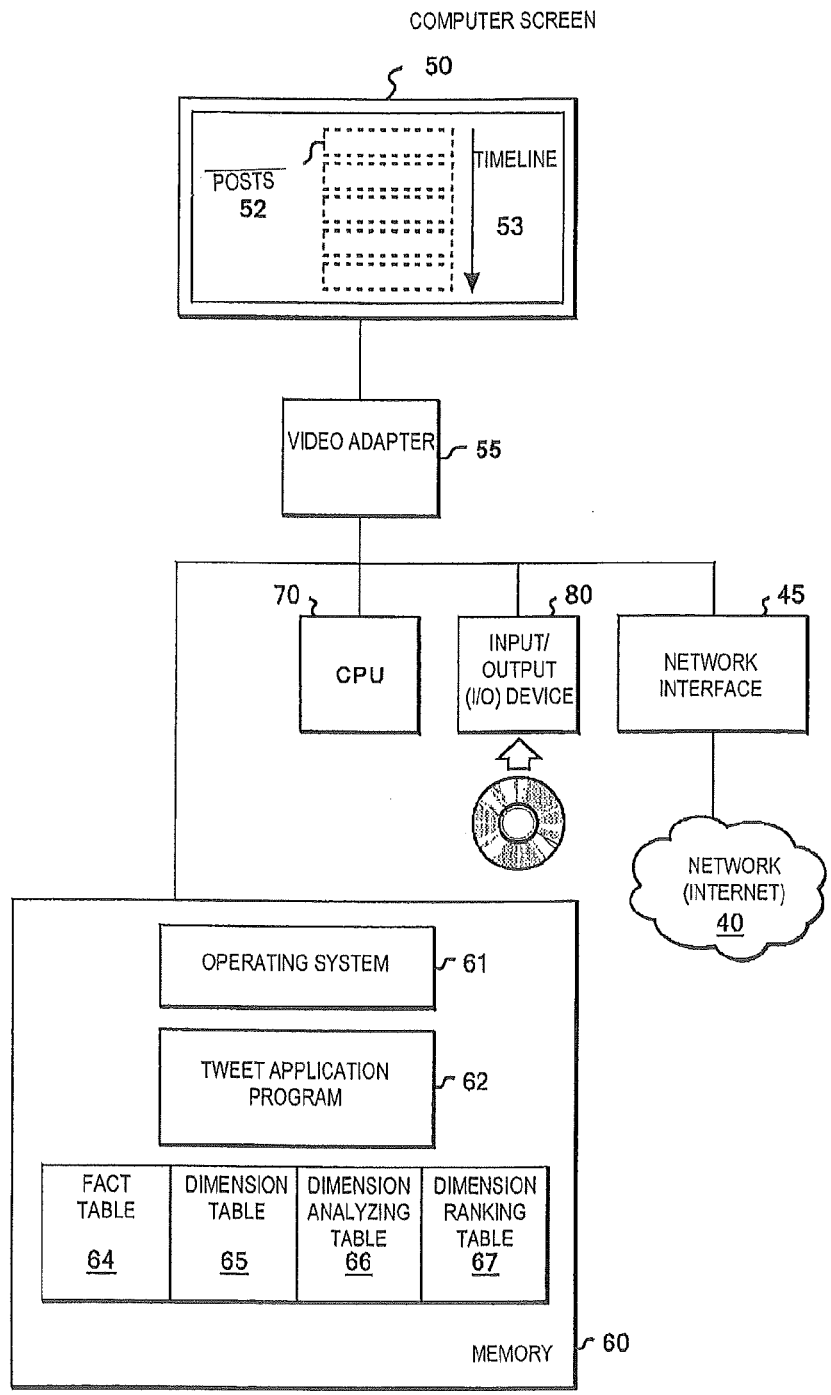
FIG. 2 is a diagram showing a configuration of a computer in which embodiments of the present invention are implemented.

FIG. 2 is a diagram showing a configuration for one of the computers 10, 20, and 30 according to an embodiment of the invention. The computer is connected to the network 40 (see FIG. 1) via a network interface 45. The computer has a computer screen 50, which may include a liquid crystal display provided as an interface for a user. In the case of a mobile phone, the user may provide input through a keyboard or push buttons. Input from the user may also be provided through a built-in keyboard or through a keyboard or a mouse connected to an external input terminal.

Newer smartphones are configured with a touch panel that accepts user operations, and thus the touch panel plays an important part as a user interface. The user may touch the touch panel with a finger or a stylus pen to select a particular post.

The computer screen 50 typically displays posts 52 of the user of the computer, as well as posts 52 from followed users (tweeters) who are users of other computers connected to the network 40. These posts 52 are displayed as individually identifiable posts in chronological order along a timeline 53.

As a display space, the computer screen 50 has some constraints. For example, in a typical display setting the latest post appears at the top of the screen and the oldest post is scrolled down until it disappears from the display screen, in real time, according to the transmission times of the posts. The user reads the posts 52 sequentially displayed along the timeline 53 to grasp a topic, theme, situation, or trend in real time.

The computer screen 50 is typically connected to a video adapter 55 and also to a memory 60, a CPU 70, and an input/output (I/O) device 80. The memory 60 stores an operating system 61 residing therein.

Typically, a tweet application program 62, which is software serving as the basis of a communication tool, is stored on the operating system 61 and stands by to control display of posts. The tweet application program 62 may be downloaded from the outside via a storage medium or may be downloaded from the outside via a network.

The memory 60 further stores a fact table 64 as a data body, a dimension table 65, a dimension analyzing data table 66, and a dimension ranking table 67. These tables are used with respect to how to display posts and implemented as a hardware resource or software, or a combination of a hardware resource and software. Details of the tables will be described below with respect to FIG. 7.

The CPU 70 controls the overall processing as the computer. Any environment in which the computer is caused to perform functions equivalent to the tweet application program 62 may be configured as the system.

Figure 3:
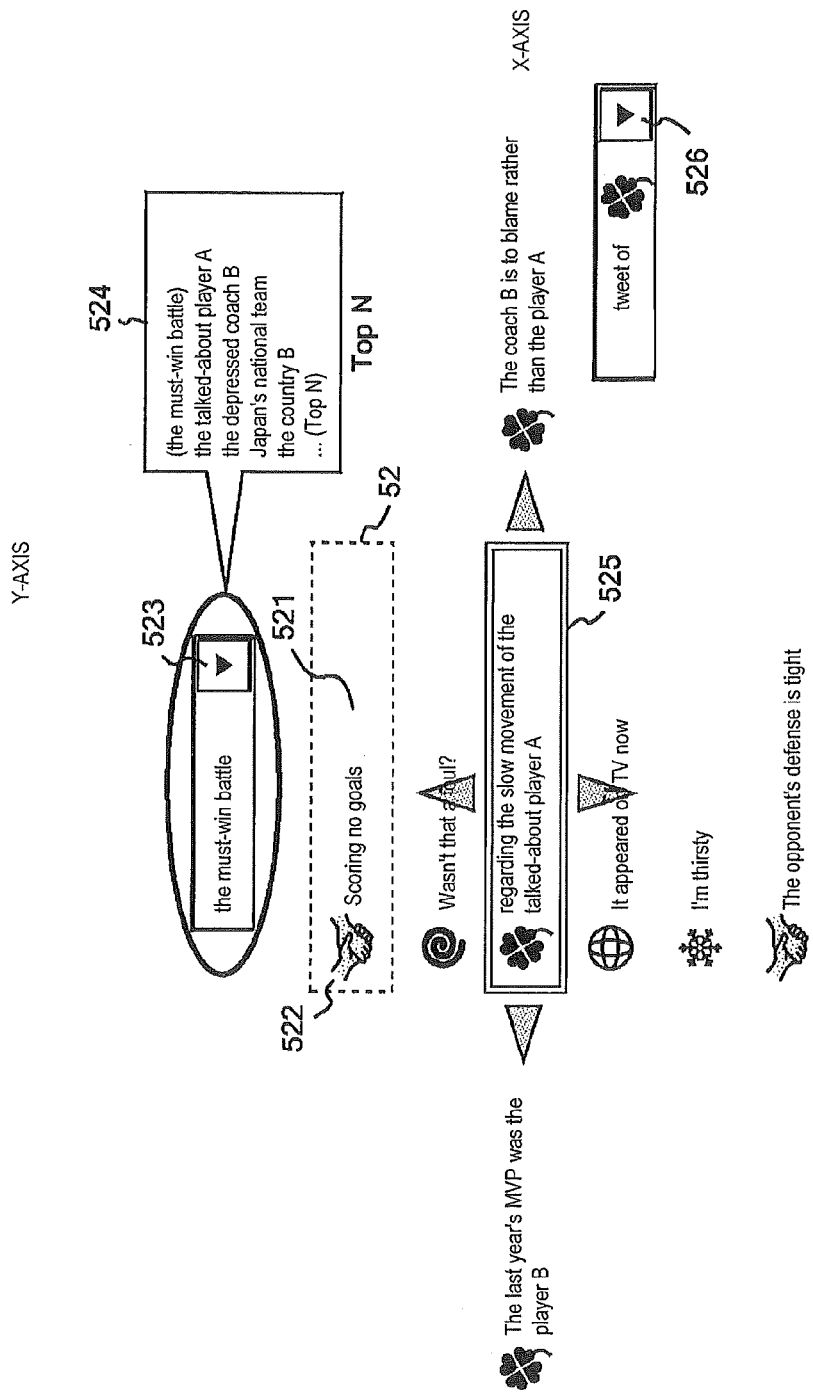
FIG. 3 is a diagram describing how posts are displayed on a computer screen according to embodiments of the present invention.

FIG. 3 is a diagram for describing how posts are displayed on the computer screen according to embodiments of the present invention.

By way of example, a posting situation is illustrated in which users using computers are watching a soccer (football) game in real time (on site or on television), and tweeting while observing the game. Here, one of the posts 52 also described in FIG. 2 is shown as surrounded with a dotted frame. The post 52 is represented as a sentence recognizable (readable) by the user on the computer screen. A phrase 521 "Scoring no goals" as a sentence is the main substance of a "tweet," and such a phrase is sequentially displayed separately for each post on the computer screen.

The Twitter service follows a rule that a tweet is made in text data of up to 140 elements (such as characters, graphics, or symbols). In this example, a "tweet" is expressed with the very short phrase 521. Further, in this example, the tweeter (user) of the post is represented by a graphic or symbol 522 (a symbol of a handshake) on the left side of the post 52. In this manner, it can be readily known which post 52 was transmitted from which tweeter's (user's) computer. A tweeter or sender of a post is also referred to herein as an "originator".

As a basic default setting, the user's own posts and posts of users whom the user is "following" are displayed on the computer screen in chronological order along a Y-axis (analysis axis) called a timeline (wherein newer posts are located higher and older posts are located lower, or vice versa). This is a setting that takes the real-time nature into account, such that the more recent a post is, the higher display priority the post is given.

As another default setting, posts are displayed in chronological order along the Y-axis or "timeline" and are also narrowed down by filtering so that only posts containing a particular "element" are displayed. In this example, a setting is made such that the computer identifies only posts containing a keyword (i.e., a combination of elements such as characters, graphics, or symbols), "the must-win battle," and displays the identified posts in chronological order along the Y-axis.

In this example, the keyword representing the flow of a topic (a kind of slogan), which is "the must-win battle," does not specifically appear in any post in the displayed posts 52 shown. However, it should be noted that the keyword is contained somewhere in the posted text data of up to 140 elements. This is because not all of the text data of up to 140 elements may be able to be displayed due to constraints on the space available for the post 52 surrounded by the dotted frame.

As a mechanism for causing the computer to prompt the user to make input or selection on the computer screen (to wait for the user's instruction), a setting may be made such that a filtering prompt 523 appears for the Y-axis.

The filtering prompt 523 may be displayed from the start as an initial default setting, or may be set to appear if the user touches anywhere on the computer screen 50. Further, the filtering prompt 523 may be set to disappear from the computer screen 50 if the user subsequently touches anywhere other than the area of the prompt 523 appearing on the computer screen 50.

Clicking on an arrow icon on the right side of the filtering prompt 523 may cause the top N keyword candidates 524 (the top N keywords extracted by counting the appearances over a predetermined period of time) to be displayed, from which the user may make a selection. The top N candidates 524 may be listed in descending order of frequency of appearances (stored in a table to be described below) and may be appropriately updated to reflect the latest situation or "trend" of posts proceeding in real time. Details of this will be described below.

The user may touch a particular keyword among the keyword candidates 524 to select the keyword and to cause the computer to perform a process of narrowing down displayed posts to only those containing the keyword. Again, direct input through the keyboard (for example, character input) may be allowed as the input from the user.

For the user's convenience, a cursor 525 indicating the position of a post desired to be marked is displayed to facilitate the user's recognition as to which post is the user's current focus of attention among the displayed posts. The cursor 525 may be moved along the timeline (the Y-axis) by the user. The cursor 525 may also be configured to allow a particular focus post among the displayed posts to be directly touched and marked.

An X-axis (right and left directions) is an axis different from the Y-axis and includes the post marked by the cursor 525. The X-axis is laid out as a second axis for displaying posts with the cursor 525 being a pivot position. Although not shown, several posts rather than only one post may be marked by the cursor 525.

Also for the X-axis, a setting may be made such that a filtering prompt 526 appears. The user may use the filtering prompt 526 in the same manner as the filtering prompt 523 for the Y-axis.

Here, the post marked by the cursor 525 is from a tweeter (user) represented by a graphic or symbol (in this example, a symbol of a four-leaf clover) on the left side of the post. Therefore, displayed posts are narrowed down so that only posts from this tweeter (user) are displayed along the X-axis. That is, for the X-axis, posts from the tweeter (user) of the graphic or symbol (in this example, the symbol of the four-leaf clover) on the left side of the marked post are additionally identified and sequentially displayed along the X-axis.

If an initial setting is made for the X-axis such that a tweeter (user) is given higher display priority over a keyword, the above identification is automatically performed. A tweeter (user) is a dimension element that is represented by a graphic or symbol (here, the four-leaf clover) like a keyword, but that is different from a keyword.

If the display setting for the X-axis is desired to be changed, clicking on an arrow icon on the right side of the prompt 526 may cause the top N "dimension element" candidates 526 to appear, from which the user may make a selection. The user may use the top N candidates 526 in the same manner as those for the Y-axis. In the display in FIG. 3, the dimension element for the Y-axis is a keyword, and the dimension element for the X-axis is a tweeter (user).

Figure 4:
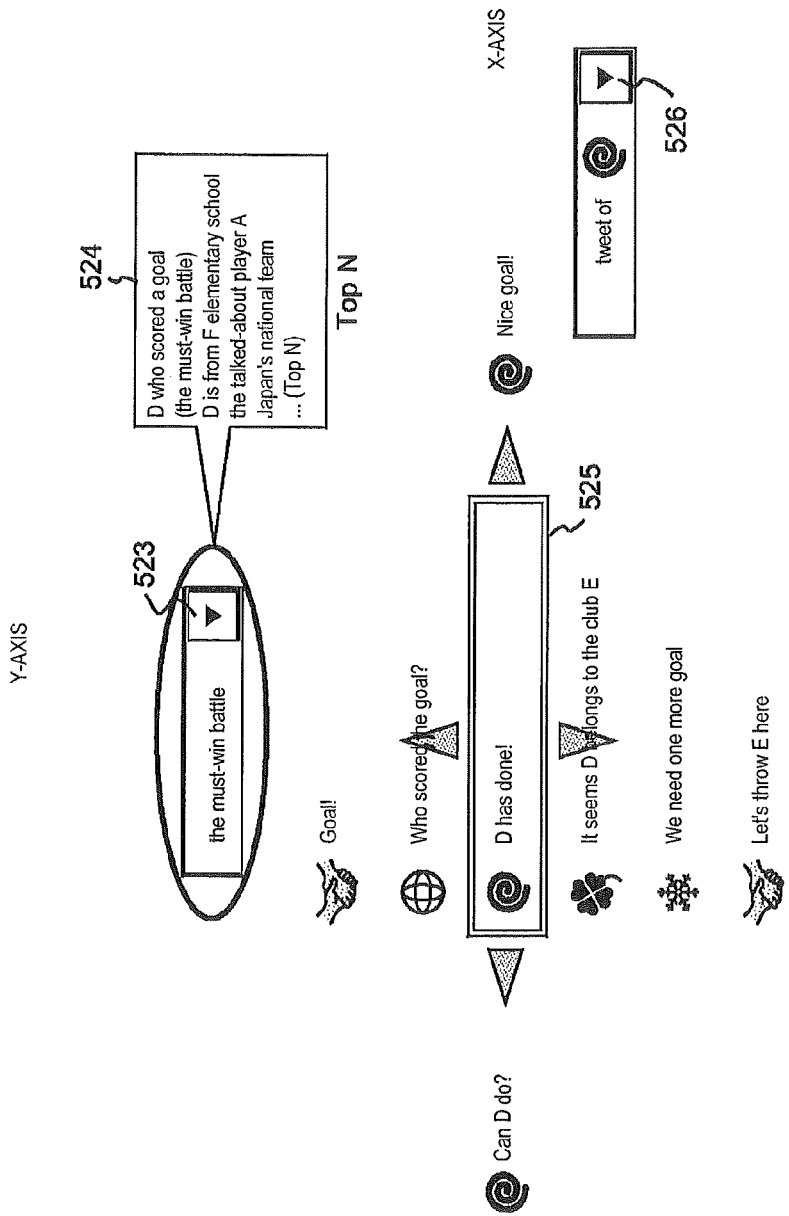
FIG. 4 is a diagram for describing how posts are displayed on the computer screen according to embodiments of the present invention, illustrating a state in which a situation has changed from FIG. 3.

FIG. 4 is a diagram for describing how posts are displayed on the computer screen according to embodiments of the present invention, illustrating a state in which the situation has changed from FIG. 3.

The top N candidates 524 may be listed in descending order of frequency of appearances (may be stored in the dimension table 65) and may be appropriately updated to reflect the latest situation or trend of posts proceeding in real time. Here, the situation or trend has changed so that "D who scored a goal" is given higher priority over "the must-win battle," which was previously given the highest display priority in FIG. 3. The latter keyword is indicated in parentheses as "(the must-win battle)," allowing the user to know the narrowing-down keyword employed for the current Y-axis display.

The cursor 525 is located on a post of a tweeter (user) indicated by a graphic or symbol of a spiral, which contains a phrase about the player "D," namely, "D who scored a goal." Therefore, posts from the tweeter (user) of the graphic or symbol of the spiral are now additionally identified and sequentially displayed along the X-axis.

Figure 5:
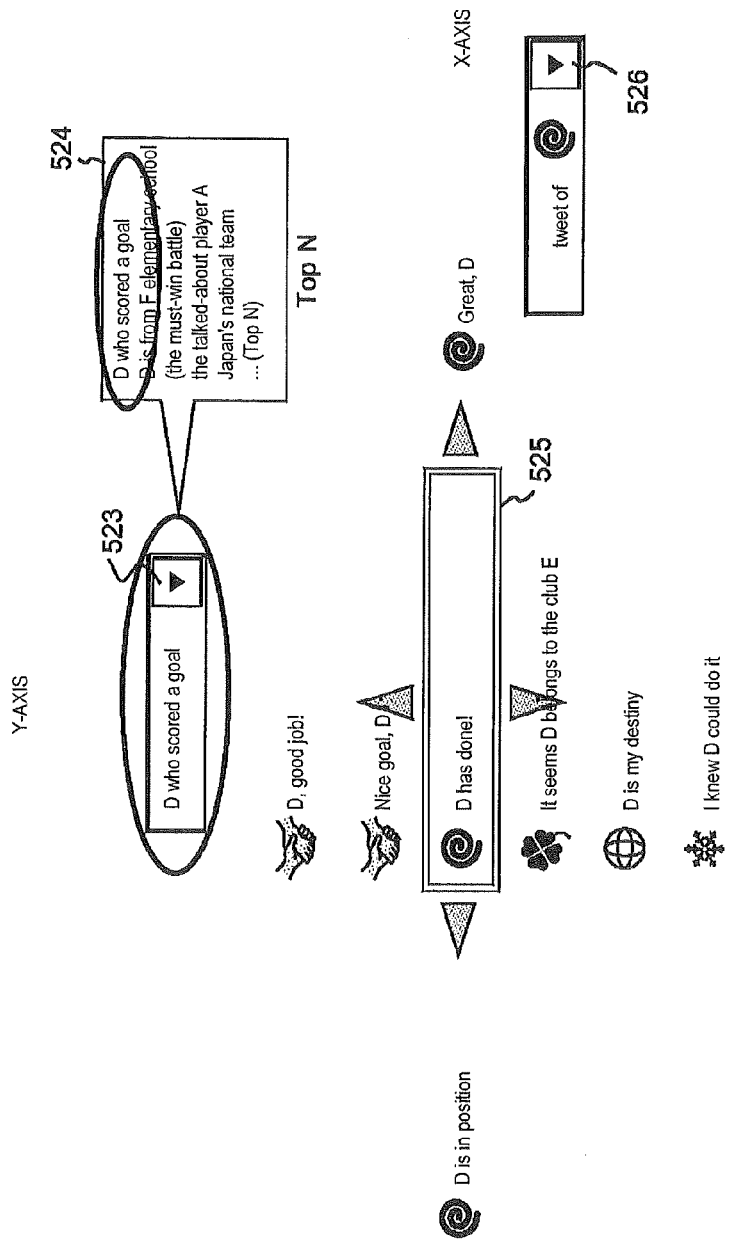
FIG. 5 is a diagram for describing how posts are displayed on the computer screen according embodiments of to the present invention, illustrating a state in which the situation has changed from FIG. 4.

FIG. 5 is a diagram for describing how posts are displayed on the computer screen according to embodiments of the present invention, illustrating a state in which the situation has changed from FIG. 4. When "D who scored a goal" is actually selected by the user's operation, the computer narrows down the displayed posts to only posts containing the keyword of "D who scored a goal," which results in the posts displayed along the Y-axis changing.

At the same time, for the posts displayed along the X-axis, the priority may have changed even though the posts are from the same tweeter (user). This is because posts of the tweeter (user) indicated by the graphic or symbol of the spiral may have been added due to the lapse of a certain period of time since the situation in FIG. 4. Therefore the posts are accordingly displayed along a timeline for the X-axis.

The X-axis may also be set as a timeline. A setting such that posts are displayed on the computer screen in chronological order along the X-axis (newer posts on the right and older posts on the left, or vice versa) may be made. This is a setting that takes the real-time nature into account, such that the more recent a post is, the higher display priority the post is given.

It is to be noted that the post marked by the cursor 525 is preferably set to be unchanged and fixed even in chronological order, as a marked pivot serving as a kind of a memorandum for the user. A setting such that the marked post is not fixed may also be readily made by those skilled in the art.

Figure 6:
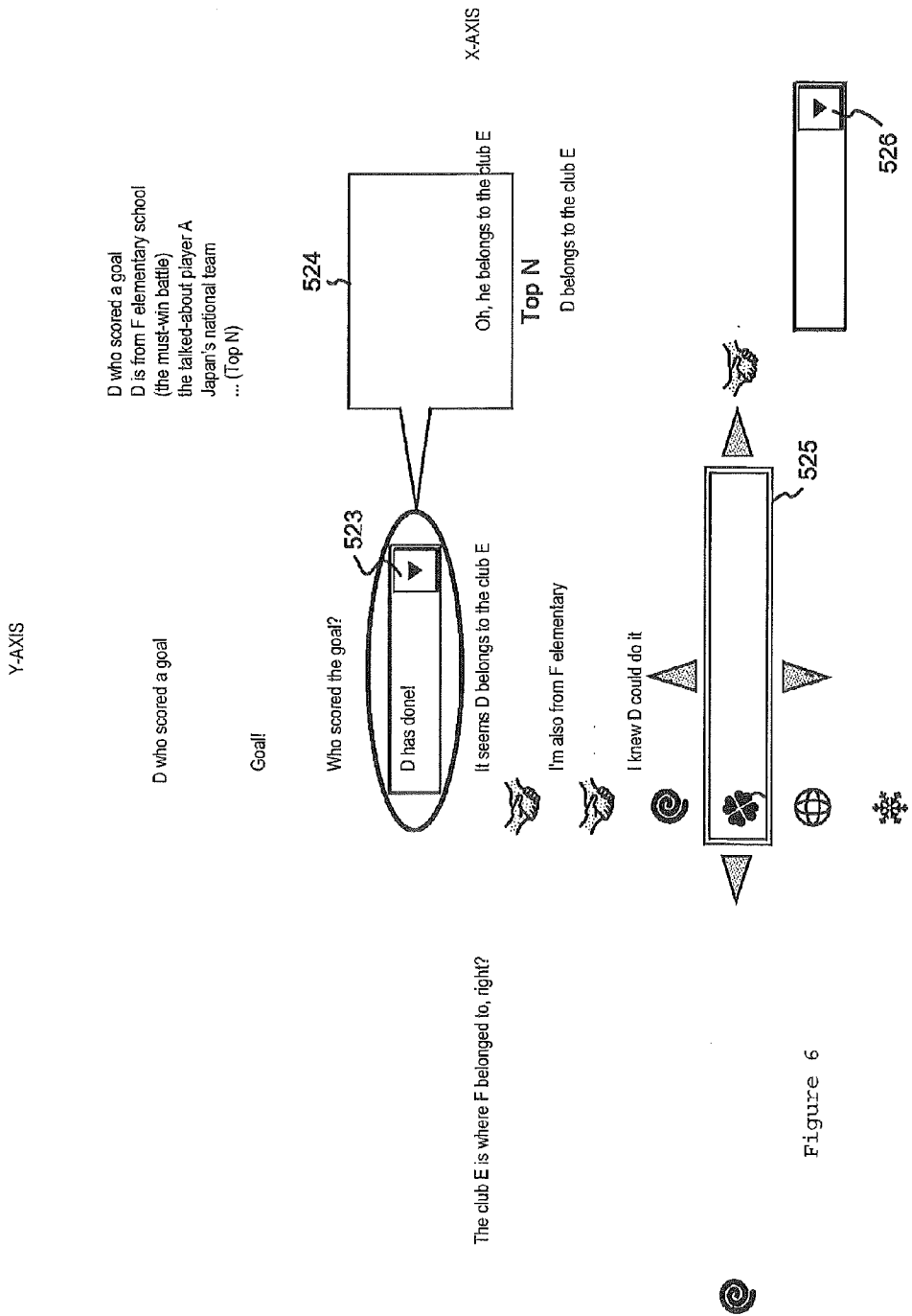
FIG. 6 is a diagram for describing how posts are displayed on the computer screen according to embodiments of the present invention, illustrating a state in which the situation has changed from FIG. 5.
Figure 6:

FIG. 6 is a diagram for describing how posts are displayed on the computer screen according to embodiments of the present invention, illustrating a state in which the situation has changed from FIG. 5.

According to the user's selection, the cursor 525 has been moved to shift the marked post from a post "D has done!" (a kind of expression of emotion) marked in FIG. 5 to a post "It seems that D belongs to the club E" below. Further, in this situation, a keyword "D belongs to the club E" in "It seems that D belongs to the club E" has been selected as a "keyword" for the X-axis to accordingly narrow down posts. Here, the narrowing down for the X-axis gives priority to a keyword over a tweeter. Therefore, posts of different tweeters are displayed along the X-axis.

In the display in FIG. 6, the dimension element for the first axis, the Y-axis, is a keyword; and the dimension element for the second axis, the X-axis, is also a keyword.

The cursor 525 may also be moved along the X-axis. In this case, the posts lining along the Y-axis change. As the marked post changes, the posts displayed along the Y-axis change. This is because the X-axis and the Y-axis are correlated through the commonality of the post at the common pivot position.

The cursor 525 as the pivot may be set at the center of the computer screen 50. The user's view and control may be facilitated if the cursor 525 is always at the center of the screen even if the cursor is moved. However, the position of the cursor 525 is not so limited.

Figure 7:
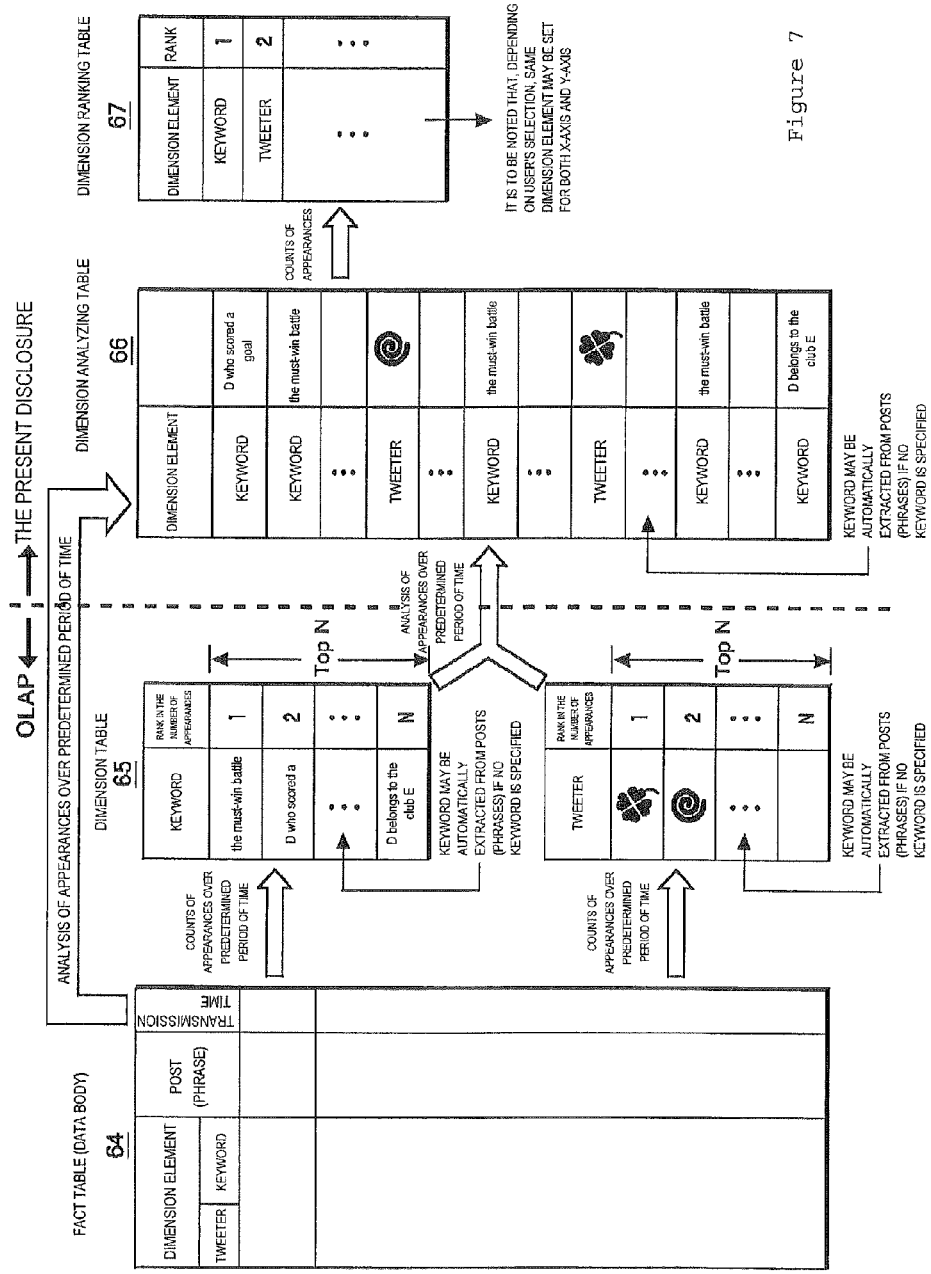
FIG. 7 is a schematic diagram showing tables used in implementing embodiments of the present invention.

FIG. 7 is a schematic diagram showing the tables used in implementing embodiments of the present invention. The fact table 64 is the data body. For each post, the fact table 64 manages the transmission time of the post, and the dimension element (an identification of a tweeter and, if specified, an identification of a keyword). The order of transmission time may be simply used to configure several timelines, which are orders of predetermined settings stored in advance in the computer.

The appearances may be counted for a predetermined period of time with the fact table 64 to generate the dimension table 65 by taking the real-time nature of the situation into account. The fact table 64 and the dimension table 65 are also generated in a technique known as OLAP (online analytical processing). The technique involves taking snapshots to reorganize data as multidimensional data.

If no keyword is specified by a tweeter, a frequently appearing keyword may be automatically extracted from relevant posts (phrases).

What is characteristic for implementing embodiments of the present invention is to generate the dimension analyzing table 66 and the dimension ranking table 67. To multilaterally analyze posts in real time, the appearances over a predetermined period of time are examined. With the real-time nature taken into account, there is an analysis as to whether a keyword is dominant or a tweeter is dominant in the latest situation according to the counts of the appearances. The display orders along the X-axis and the Y-axis are set accordingly.

It is important for multilateral analysis that each analysis axis can be assigned a different dimension element, e.g., a keyword for the X-axis and a tweeter for the Y-axis, and that the different dimension elements can be displayed as lists on the screen in real time. It is to be noted that, depending on the user's selection, the same dimension element may be set for both the X-axis and the Y-axis (without following the dimension ranking table 67) (see FIG. 6).

Figure 8:
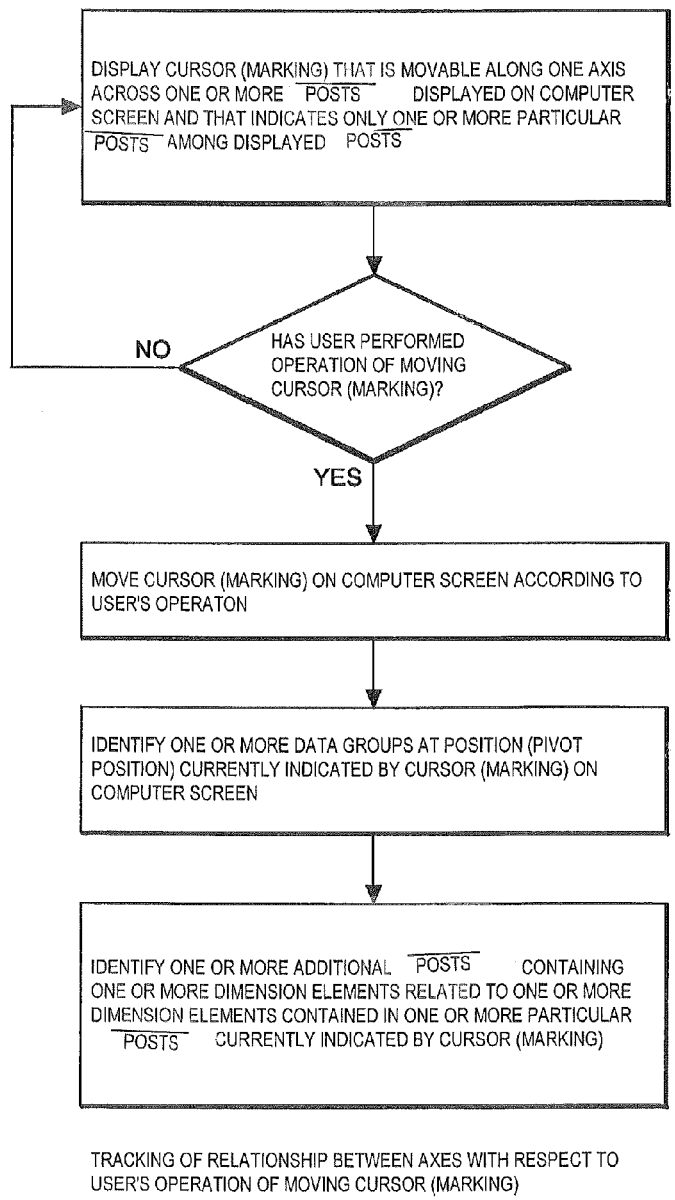
FIG. 8 is a diagram showing the process of tracking the relationship between axes with respect to a user's operation of moving a cursor (marking) in implementing embodiments of the present invention.

FIG. 8 is a diagram showing the process of tracking the relationship between the axes with respect to the user's operation of moving the cursor (marking) in implementing embodiments of the present invention.

Figure 9:
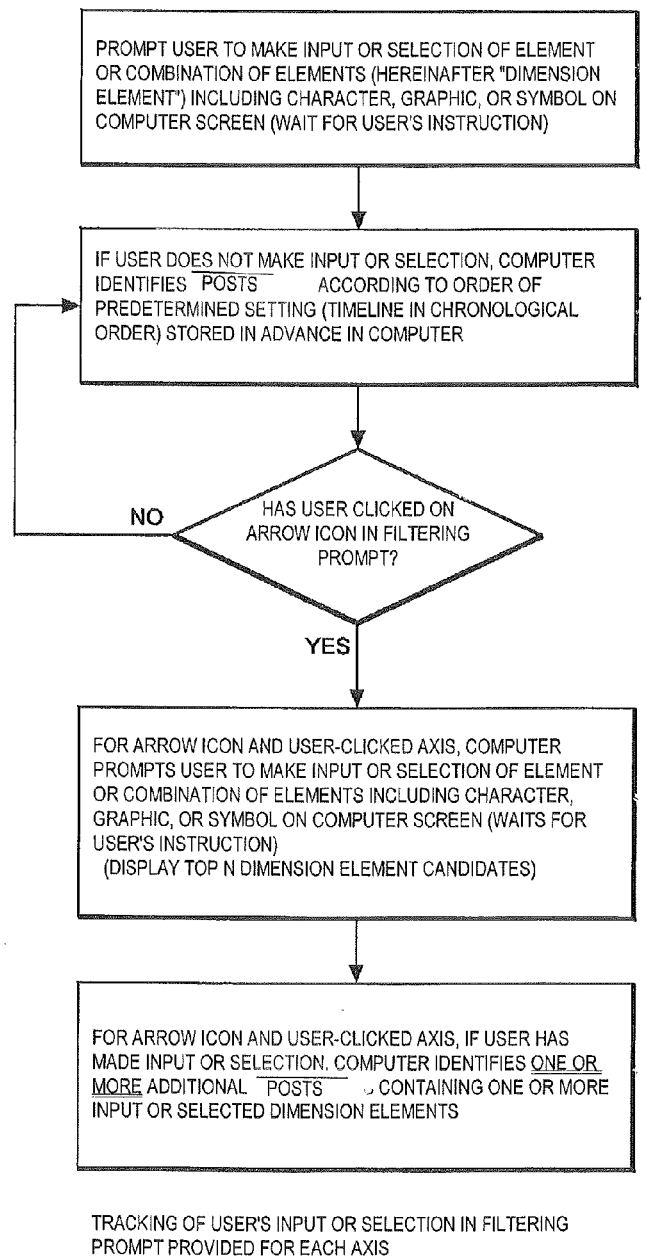
FIG. 9 is a diagram showing the process of tracking the user's input or selection in a filtering prompt provided for each axis in implementing embodiments of the present invention.

FIG. 9 is a diagram showing the process of tracking the user's input or selection in the filtering prompt provided for each axis in implementing embodiments of the present invention.

The above description has been made for the two axes of the X-axis and the Y-axis. Those who have the general knowledge in the technical field of the present invention may add a Z-axis to provide stereoscopic display (for example, in the direction of depth on the computer screen).

The dimension elements are not necessarily limited to the two types: a tweeter and a keyword. Rather, the dimension elements may be easily expanded to many types, such as adding "the opposite person to talk to" as a dimension element.

In general OLAP, the user may drag and drop an arbitrary one of displayed analysis axes on another analysis axis to exchange the display areas of the analysis axes. Similarly in the present disclosure, the user may perform a predetermined operation to exchange the displayed axes. For example, the user may drag the filtering prompt 526 for the X-axis and drop it on the filtering prompt 523 for the Y-axis to exchange the displayed content of the axes.

The invention claimed is:

1. A method for sequentially displaying posts apart from each other on a computer screen, each post representing a sentence visually recognizable by a user on the computer screen, the method comprising:
    prompting the user to input a first dimension element including one or more of a character, graphic, or symbol on the computer screen;
    identifying, by a computer, posts containing one or more dimension elements, including the first dimension element, responsive to the user's input;
    sequentially displaying the identified posts apart from each other along a first axis on the computer screen;
    displaying a cursor that is at a fixed location on the computer screen and that is operable by the user to move the one or more posts displayed on the computer screen along the first axis, wherein the cursor indicates only one or more particular posts among the displayed posts;
    moving the one or more posts displayed on the computer screen according to the user's operation;
    identifying one or more posts at a position currently indicated by the cursor on the computer screen;
    prompting the user to input a second dimension element including one or more of a character, graphic or symbol on the computer screen, the second dimension element selected by the user from dimension elements in the or more posts at a position currently indicated by the cursor on the computer screen, wherein the dimension elements vary based on the position currently indicated by the cursor on the computer screen;
    identifying, by the computer, one or more additional posts containing one or more dimension elements including the second dimension element, responsive to the user's input; and
    sequentially displaying posts of the one or more additionally identified posts apart from each other along a second axis different from the first axis and visually recognizable on the computer screen, wherein the cursor is further operable by the user to move the one or more additionally identified posts displayed on the computer screen along the second axis, wherein the cursor indicates only one or more particular additionally identified posts among the displayed additional posts.

2. The method according to claim 1, wherein the prompting comprises displaying top N keyword candidates.

3. The method according to claim 1, further comprising identifying posts according to an order of a predetermined setting stored in advance in the computer in the absence of input by the user.

4. The method according to claim 3, wherein the order of the predetermined setting stored in advance in the computer is a timeline in chronological order.

5. The method according to claim 1, wherein the first dimension element comprises an originator of a sentence and a keyword.

6. The method according to claim 1, wherein the first dimension element for the first axis and the second dimension element for the other second axis are displayed as different dimension elements.

7. The method according to claim 1, wherein the first dimension element for the first axis and the second dimension element for the second axis are displayed as the same dimension element.

8. A system for sequentially displaying posts apart from each other on a computer screen, each post representing a sentence visually recognizable by a user on the computer screen, the system comprising:
  a processor configured to:
    prompt the user to input a first dimension element including one or more of a character, graphic, or symbol on the computer screen;
    identify posts containing one or more dimension elements, including the first dimension element, responsive to the user's input;
    sequentially display the identified posts apart from each other along a first axis on the computer screen;
    display a cursor that is at a fixed location on the computer screen and that is operable by the user to move the one or more posts displayed on the computer screen along the first axis, wherein the cursor indicates only one or more particular posts among the displayed posts;
    move the one or more posts displayed on the computer screen according to the user's operation;
    identify one or more posts at a position currently indicated by the cursor on the computer screen;
    prompt the user to input a second dimension element including one or more of a character, graphic or symbol on the computer screen, the second dimension element selected by the user from dimension elements in the or more posts at a position currently indicated by the cursor on the computer screen, wherein the dimension elements vary based on the position currently indicated by the cursor on the computer screen;
    identify one or more additional posts containing one or more dimension elements including the second dimension element, responsive to the user's input; and
    sequentially display posts of the one or more additionally identified posts apart from each other along a second axis different from the first axis and visually recognizable on the computer screen, wherein the cursor is further operable by the user to move the one or more additionally identified posts displayed on the computer screen along the second axis, wherein the cursor indicates only one or more particular additionally identified posts among the displayed additional posts.

9. The system according to claim 8, wherein the processor is further configured to prompt by displaying top N keyword candidates.

10. The system according to claim 8, wherein the processor is further configured to identify posts according to an order of a predetermined setting stored in advance in the computer in the absence of input by the user.

11. The system according to claim 10, wherein the order of the predetermined setting stored in advance in the computer is a timeline in chronological order.

12. The system according to claim 8, wherein the first dimension element comprises an originator of a sentence and a keyword.

13. The system according to claim 8, wherein the first dimension element for the first axis and the second dimension element for the second axis are displayed as different dimension elements.

14. A computer program product for sequentially displaying posts apart from each other on a computer screen, each post representing a sentence visually recognizable by a user on the computer screen, the computer program product comprising:
  a non-transitory computer readable storage medium having computer readable program code embodied therewith, the computer readable program code comprising:
  computer readable program code configured to:
    prompt the user to input a first dimension element including one or more of a character, graphic, or symbol on the computer screen;
    identify posts containing one or more dimension elements, including the first dimension element, responsive to the user's input;
    sequentially display the identified posts apart from each other along a first axis on the computer screen;
    display a cursor that is at a fixed location on the computer screen and that is operable by the user to move the one or more posts displayed on the computer screen along the first axis, wherein the cursor indicates one or more particular posts among the displayed posts;
    move the one or more posts displayed on the computer screen according to the user's operation;
    identify one or more posts at a position currently indicated by the cursor on the computer screen;
    prompt the user to input a second dimension element including one or more of a character, graphic or symbol on the computer screen, the second dimension element selected by the user from dimension elements in the or more posts at a position currently indicated by the cursor on the computer screen, wherein the dimension elements vary based on the position currently indicated by the cursor on the computer screen;
    identify one or more additional posts containing one or more dimension elements including the second dimension element, responsive to the user's input; and
    sequentially display posts of the one or more additionally identified posts apart from each other along a second axis different from the first axis and visually recognizable on the computer screen, wherein the cursor is further operable by the user to move the one or more additionally identified posts displayed on the computer screen along the second axis, wherein the cursor indicates only one or more particular additionally identified posts among the displayed additional posts.

15. The computer program product according to claim 14, wherein the prompting comprises displaying top N keyword candidates.

16. The computer program product according to claim 14, wherein the computer readable program code is further configured to identify posts according to an order of a predetermined setting stored in advance in the computer in the absence of input by the user.

17. The computer program product according to claim 16, wherein the order of the predetermined setting stored in advance in the computer is a timeline in chronological order.

18. The computer program product according to claim 14, wherein the first dimension element for the first axis and the second dimension element for the second axis are displayed as the same dimension element.

\* \* \* \* \*